United States Patent
Choi et al.

(10) Patent No.: US 9,643,562 B1
(45) Date of Patent: May 9, 2017

(54) AIRBAG WITH PASSIVE ADAPTIVE VENTING

(71) Applicant: Autoliv ASP, Inc., Ogden, UT (US)

(72) Inventors: Changsoo Choi, Rochester, MI (US); Frank Herzenstiel, Davisburg, MI (US); Pontus Soderstrom, Rochester, MI (US); James Jacobson, Waterford, MI (US); Michael J. Lachat, Shelby Township, MI (US); Russ Morris, Auburn Hills, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 15/147,664

(22) Filed: May 5, 2016

(51) Int. Cl.
  *B60R 21/239* (2006.01)
  *B60R 21/205* (2011.01)
  *B60R 21/00* (2006.01)

(52) U.S. Cl.
  CPC .......... *B60R 21/239* (2013.01); *B60R 21/205* (2013.01); *B60R 2021/0032* (2013.01)

(58) Field of Classification Search
  CPC ............................ B60R 21/239; B60R 21/205
  See application file for complete search history.

(56) References Cited

U.S. PATENT DOCUMENTS

| 5,018,761 A * | 5/1991 | Henseler ............... B60R 21/239 280/730.1 |
| 6,971,670 B1 * | 12/2005 | Eriksson ............... B60R 21/231 280/739 |
| 7,475,904 B2 * | 1/2009 | Hofmann ........... B60R 21/23138 280/730.2 |
| 7,878,537 B2 * | 2/2011 | Maertens .............. B60R 21/233 280/739 |
| 8,500,164 B2 | 8/2013 | Mendez |
| 9,016,721 B1 | 4/2015 | Potter et al. |
| 2002/0047253 A1 * | 4/2002 | Rasch ................ B60R 21/23138 280/728.2 |
| 2008/0023945 A1 * | 1/2008 | Zauritz ............. B60R 21/23138 280/729 |
| 2011/0062692 A1 * | 3/2011 | Yamane ............ B60R 21/23138 280/739 |
| 2011/0074141 A1 * | 3/2011 | Wipasuramonton B60R 21/23138 280/736 |

(Continued)

FOREIGN PATENT DOCUMENTS

| DE | 10146493 A1 | 4/2003 |
| DE | 102004042209 A1 | 5/2006 |
| DE | 102004048898 A1 | 9/2006 |

(Continued)

*Primary Examiner* — James A English
(74) *Attorney, Agent, or Firm* — Stoel Rives LLP

(57) ABSTRACT

Airbags and airbag assemblies are disclosed that include passive adaptive venting. The disclosed embodiments include an airbag cushion to define an inflation chamber and that include a set of vents. The set of vents is disposed through a panel of the airbag cushion. The set of vents allow egress of inflation gas from the inflation chamber and to be in an open state when a degree of compression of the airbag cushion is below a threshold level. The set of vents is configured to be in a closed state and/or obstructed by a vehicle surface of a vehicle structure when the degree of compression of the airbag cushion exceeds the threshold level.

12 Claims, 12 Drawing Sheets

(56) References Cited

U.S. PATENT DOCUMENTS

2012/0018988 A1* 1/2012 Schuller .................. B60N 2/16
  280/730.2
2014/0125039 A1* 5/2014 Abele .................. B60R 21/239
  280/730.1

FOREIGN PATENT DOCUMENTS

| GB | 2353008 A | 2/2001 |
| WO | 2006024472 A1 | 3/2006 |
| WO | 2012167908 A1 | 12/2012 |

* cited by examiner

AIRBAG WITH PASSIVE ADAPTIVE VENTING

BACKGROUND

Inflatable airbags may be mounted within a vehicle and deployed during a collision event. The deployed airbag may cushion an occupant and prevent detrimental impact with other vehicular structures. Airbag vents can be used to change one or more characteristics of a deployed airbag to mitigate detrimental impact of a variety of occupants in a variety of collision events and scenarios. Some airbag vents or venting systems suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1A:
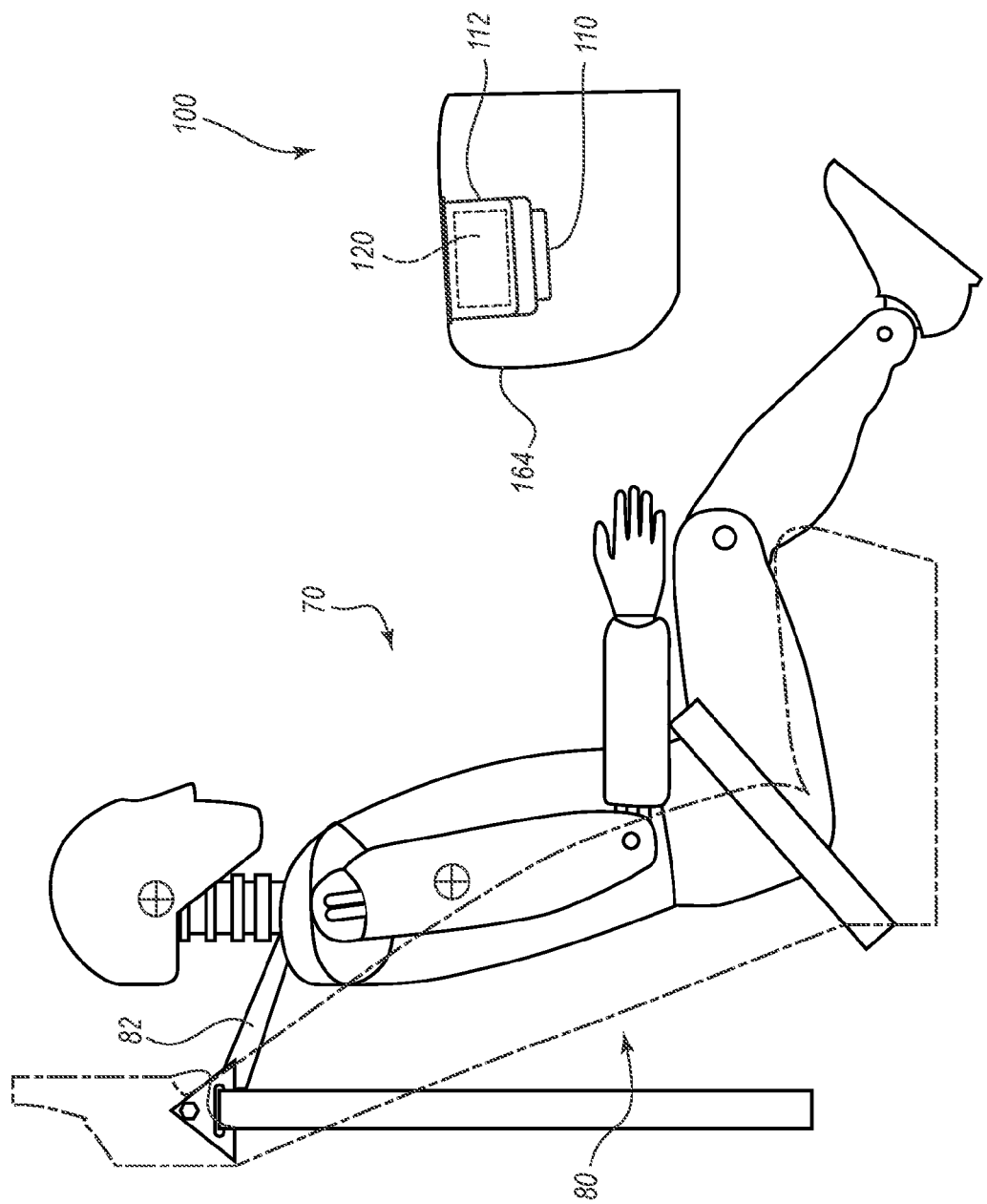
FIG. 1A is a side elevation view of one embodiment of an airbag assembly mounted in an instrument panel of a vehicle depicted prior to deployment.

As will be readily understood, the components of the embodiments as generally described and illustrated in the figures herein could be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

Inflatable airbag systems are widely used, often in connection with other vehicle restraint devices (e.g., a seatbelt) to reduce or minimize occupant injury during a collision event. Airbag modules have been installed at various locations within a vehicle, including, but not limited to, the steering wheel, the dashboard and/or instrument panel, within the side doors or side seats, adjacent to a roof rail of the vehicle, in an overhead position, or at the knee or leg position. In the following disclosure, "airbag" generally refers to an inflatable front airbag assembly, such as, for example, a driver airbag (DAB) that is typically housed within a steering wheel assembly, although the principles discussed may apply to other types of airbags (e.g., passenger airbags, knee airbags, side airbags). A typical airbag system or assembly may comprise a housing, an inflator, and an airbag cushion. The airbag cushion may also be referred to as an airbag chamber, and may define an inflation chamber. Typically, the inflator can be encased within, or otherwise coupled to, the housing. The airbag cushion is typically installed in the airbag assembly in a packaged state (e.g., rolled, folded, and/or otherwise compressed) to fit within the housing.

Front airbags, generally, are installed in a steering wheel assembly and/or in a dashboard or instrument panel of a vehicle. As used herein, the terms "dashboard" and "instrument panel" refer to a protruding region of a vehicle faced by a motor vehicle occupant, which often includes a glove compartment in a portion thereof that faces a passenger and may include instruments (e.g., radio and/or climate controls) in a more central region thereof, although such instruments need not be present. During installation, the airbag cushion may be retained in the packaged state behind a cover. For the purposes of this disclosure, the packaged state may be referred to as a pre-deployed state, or undeployed state. During a collision event, an inflator is triggered, which rapidly fills the airbag cushion with inflation gas. The state in which the airbag cushion is filled with or being filled with the inflation gas may be referred to as the deployed state. In other words, an airbag deploys when the inflator is triggered and fills the airbag cushion with inflation gas. The airbag can rapidly transition from the packaged state to an expanded or deployed state. For example, the expanding airbag cushion can open an airbag cover (e.g., by tearing through a burst seam or opening a door-like structure) to extend outward from the housing. The inflator may be triggered by any suitable device or system, and the triggering may be in response to and/or influenced by one or more vehicle sensors.

Certain embodiments of airbag assemblies that are disclosed herein are particularly well suited for use as passenger airbags, and may be mounted in a dashboard. In some embodiments, an airbag assembly includes a housing, an inflator, and an airbag cushion. Disclosures provided herein in the context of passenger airbag assemblies, however, should not be construed as limiting, as other or further embodiments can be used with other suitable airbag assemblies. For example, some embodiments are suitable for use in driver airbag assemblies. Further embodiments may be used in any other airbag assembly that provides passive adaptive venting in the manners disclosed herein.

During a collision event, the airbag cushion may inflate with an inflation gas to an internal gas pressure. The airbag cushion may provide a rearward face, rearward panel, or rearward portion configured to receive and cushion an occupant during the collision event. However, the internal gas pressure or configuration of a deployed airbag may not be configured or optimized to mitigate damage to occupants of different sizes, or in collisions of different severities, forces, or energies. Elements of a collision event, such as occupant size or collision severity, that may affect the trajectory of the occupant during the collision event may be referred to as collision variables. To account for one or more collision variables in order to reduce or mitigate damage or injury to an occupant, the internal gas pressure of the airbag cushion may be adjusted.

For example, an occupant of relatively small size (e.g., a child weighing 35 kg) may benefit from a deployed airbag cushion having a relatively lower internal gas pressure and/or rigidity, which may provide for a relatively softer receipt of the occupant during a collision. By contrast, an occupant of relatively greater size (e.g., an adult weighing 110 kg) may benefit from a deployed airbag cushion having a relatively higher internal gas pressure and/or rigidity, which may cushion the impact of the occupant while keeping the occupant from striking an interior surface of the vehicle disposed on the opposing side of the airbag cushion from the occupant. Furthermore, an occupant of a vehicle in a relatively more severe (e.g. high speed) vehicle collision may similarly benefit from a relatively more rigid airbag cushion. The rigidity of an airbag may be related to, or partially defined by, the internal gas pressure of the deployed airbag cushion. For example, an airbag cushion having a relatively greater internal gas pressure may have a relatively decreased ability to deform or compress in response to a compression force applied by a vehicle occupant.

To compensate for some one or more of the collision variables described above, and in order to mitigate detrimental impact or other harm to an occupant, some presently available airbag systems can include one or more airbag vents that can be activated to account for one or more of the collision variables. For example, one or more airbag vents could be activated to vent inflation gas from the airbag cushion in a collision event if the occupant to be received by the airbag cushion is a small child. Such venting configurations may use an electronic input from a sensor, such as a weight sensor in the seat, to determine whether the weight of the occupant is below a threshold weight level. If the sensor registers a weight or load that falls below a threshold level, the sensor may send a signal (or may send no signal) to activate one or more airbag vents. The vents may be activated or opened by, for example, cutting a tether. Such airbag systems, however, may rely on expensive and/or complex subsystems, devices, and electronics to function, and may fail to compensate for one or more of the collision variables described above.

Various embodiments disclosed herein can address the shortcomings described above, and/or ameliorate other disadvantages of known airbag assemblies. For example, certain passive adaptive venting features are disclosed herein. One or more of the advantages of various embodiments described below will be evident from the present disclosure.

FIGS. 1A-1E provide side elevation views of an occupant 70 and an airbag assembly 100, according to one embodiment, at various times relating to a plurality of collision events. As depicted in FIGS. 1A-1E, the occupant 70 is seated and secured by a seatbelt 82 in a seat 80 of a vehicle. In some embodiments, the occupant 70 may be seated generally rearward of the airbag assembly 100 that is coupled to and disposed within an instrument panel 164. In other embodiments, the occupant 70 may be seated rearward of a steering wheel system in which an airbag housing is disposed (e.g., in the front driver's seat).

The airbag assembly 100 depicted in FIGS. 1A-1E may further include a housing 112, an inflator 110, and an airbag cushion 120. The housing 112 may be mounted to, or inside the instrument panel 164. In other embodiments, the housing 112 may be mounted inside a steering wheel. The inflator 110 may be encased within the housing 112. In a packaged or undeployed state, the airbag cushion 120 may be rolled, folded, or otherwise encased in the housing 112. When the airbag assembly 100 is deployed by, for example, a collision event, the airbag cushion 120 may be filled with inflation gas to expand and at least partially extend outside of the housing 112.

In other embodiments, the housing 112 may be mounted inside a steering wheel, or within another component or structure within the vehicle.

FIG. 1A is a side elevation view of an instrument panel 168 and an airbag assembly 100 within a vehicle. The instrument panel 168 may also be referred to herein as a dashboard. The airbag assembly 100 is shown in a packaged or undeployed state. The occupant 70 is seated in a seat 80, and secured by a seatbelt 82 prior to a collision event. The occupant 70 shown in FIG. 1A may represent an occupant of one of various sizes, such as a full-size adult.

Figure 1B:
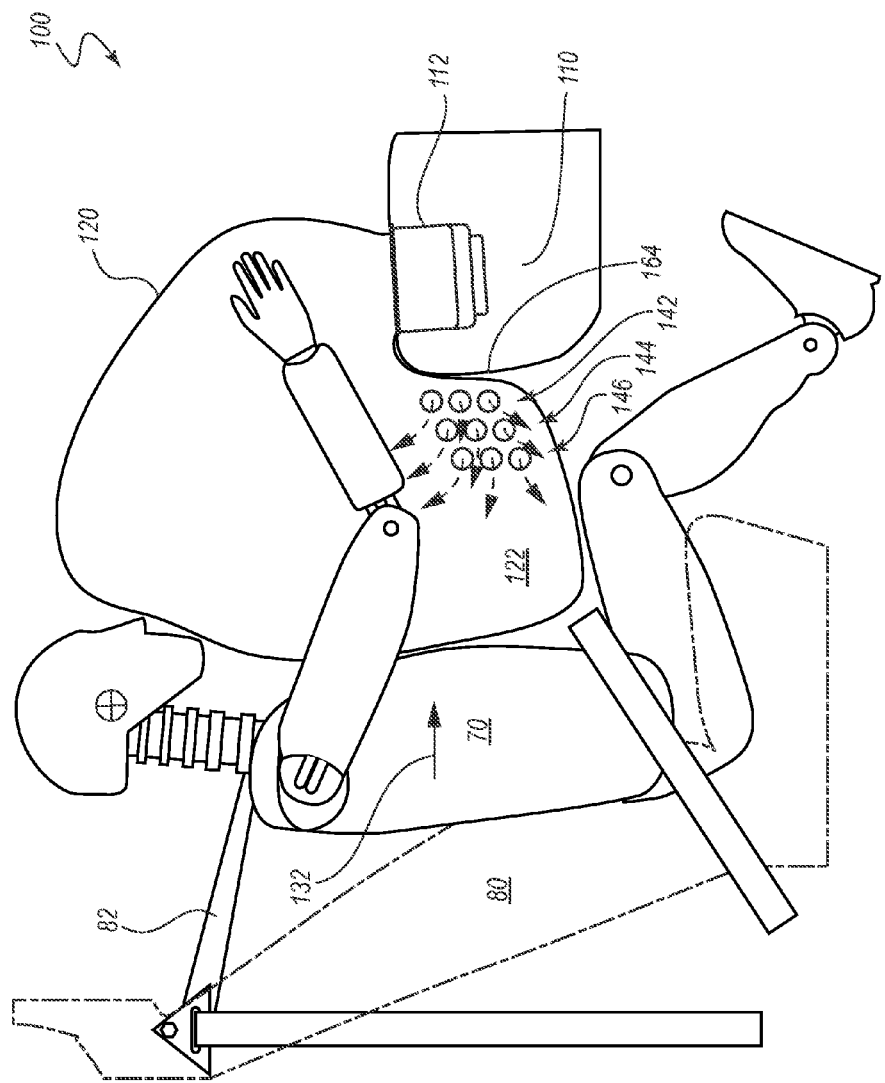
FIG. 1B is a side elevation view of the airbag assembly of FIG. 1A depicted during a collision event in which an occupant is applying a first amount of compression force to an airbag cushion and a degree of compression of the airbag cushion is minimal.

FIG. 1B is a side elevation view of the instrument panel 168 and airbag assembly 100 of FIG. 1A in a deployed state during a collision event. The occupant 70 is applying a first amount of compression force 132 to the airbag cushion 120. The first amount of compression force 132 causes the airbag cushion to compress to a first degree or level of compression, or to a first compressed state. The airbag cushion 120 of FIG. 1B includes three sets, or columns, of vents 142, 144, 146. The three sets of vents 142, 144, 146 are disposed through a lateral panel 122 of the airbag cushion 120. For the purposes of this disclosure, a "set" of vents may be defined as one or more vents. Thus, a set of vents may comprise a single vent, or a plurality of vents. Referring to FIG. 1B, the three sets of vents 142, 144, 146 are configured in columns arranged sequentially along a horizontal axis of the lateral panel 122 of the airbag cushion 120. The airbag cushion 120 is shown at least partially inflated with inflation gas, with the three sets of vents 142, 144, 146 in an open state, and generally unobstructed. The open state may refer to a state or configuration in which one or more vents allow for egress and/or entrance of a gas. By contrast, a closed state may refer to a state or configuration of one or more vents in which the egress of gas from the airbag cushion is inhibited or limited. The state or configuration of one or all sets of vents may depend at least partially on the amount of compression force applied to the airbag cushion or a degree of compression of the airbag cushion.

Referring generally to FIGS. 1A to 1E, the general direction and amount of compression force applied to the airbag cushion 120 by the occupant 70 may be represented in each figure by one or more force arrows (e.g., 132, FIG. 1B). A greater number of force arrows may represent a greater amount of compression force being applied to the airbag cushion 120 by the occupant 70. The amount of force applied to the airbag cushion 120 by the occupant 70 may depend on a number of factors, including: the size of the occupant 70, the force exerted on the vehicle during the collision event, the restraining force applied by an occupant restraint device (e.g., the seatbelt 82), and the point in time at which the occupant 70 is contacting the airbag cushion 120. For example, when the occupant 70 first comes into contact with the inflated airbag cushion 120 during or after a collision event, the amount of compression force applied to the airbag cushion 120 by the occupant 70 may be less than the compression force applied at a later point in time in which the occupant 70 is in contact with the airbag cushion 120 during or after the collision event. As the occupant 70 travels in the car-forward direction from the time of first contact to a later time, a rear portion, or panel, of the airbag cushion 120 may deform in response to the occupant's contact with the rear portion. As the rear portion of the airbag cushion 120 deforms in response to the occupant's contact, the ability of the rear portion to further deform decreases, which may increase the compression force applied to, or experienced by, the airbag cushion 120 as the occupant 70 advances in the car-forward direction.

As will be further described below in relation to FIG. 1C, the state or configuration of the three sets of vents 142, 144, 146 depicted in FIGS. 1B-1E may depend on the amount of compression force applied to the airbag cushion 120 and/or a degree of compression of the airbag achieved as a result of the compression force. In some embodiments, a compression force may cause the airbag cushion 120 to deform and compress against an interior surface of the vehicle, such as the instrument panel 168, such that at least one of the three sets of vents 142, 144, 146 abuts the interior surface. The at least one of the three sets of vents 142, 144, 146 abutting against the interior surface of the vehicle may obstruct one or more egress paths of a portion of inflation gas. When a set of vents abuts, or is obstructed by, the interior surface of the vehicle (e.g., within an occupant compartment of the vehicle), or where the set of vents lies coplanar to the plane of the vehicle surface, the set of vents may be described as being in the closed state, or closed configuration. By contrast, when a vent does not abut the vehicle surface, or in other words, when the plane defined by the opening of a vent is transverse to, or partially transverse to a plane on the vehicle surface, the vent may be described as open, or in the open state.

Referring again to FIG. 1B, the occupant 70 is shown applying a first amount of compression force 132 to the airbag cushion 120. The first amount of compression force 132 may relate to the force applied to the airbag cushion 120 during a relatively minor or low-energy collision event. Thus, the first amount of compression force 132 applied to the airbag cushion 120 by the occupant 70 may be a relatively small amount of compression force. With the occupant 70 applying the first amount of compression force 132 to the airbag cushion 120, a small degree of compression of the airbag may result and all three sets of vents 142, 144, 146 may be in the open state. In other words, the first amount of compression force 132 may be such that the degree of compression of the airbag does not reach a first threshold level of compression required to change a first set of vents 142 to the closed state. While all three sets of vents 142, 144, 146 are in the open state, the airbag cushion 120 may have a maximum venting capacity for its configuration. Venting capacity may be described as the ability of the airbag cushion 120 to vent inflation gas from the airbag cushion 120 to the outside environment (e.g. vehicle cabin). Greater venting capacity may be accomplished by including and/or activating more vents on the airbag cushion 120, or by including larger vents having a large surface area, thereby allowing for a greater flux of gas out of the airbag cushion 120. Although venting capacity may be manipulated or otherwise impacted by the inclusion and/or activation of additional vents, the amount of gas that escapes the airbag cushion may also at least partially depend on an internal gas pressure of the airbag cushion 120 and/or the compression force 132 on the airbag cushion 120 (e.g., on a rearward surface or occupant facing surface of the airbag cushion 120).

Figure 1C:
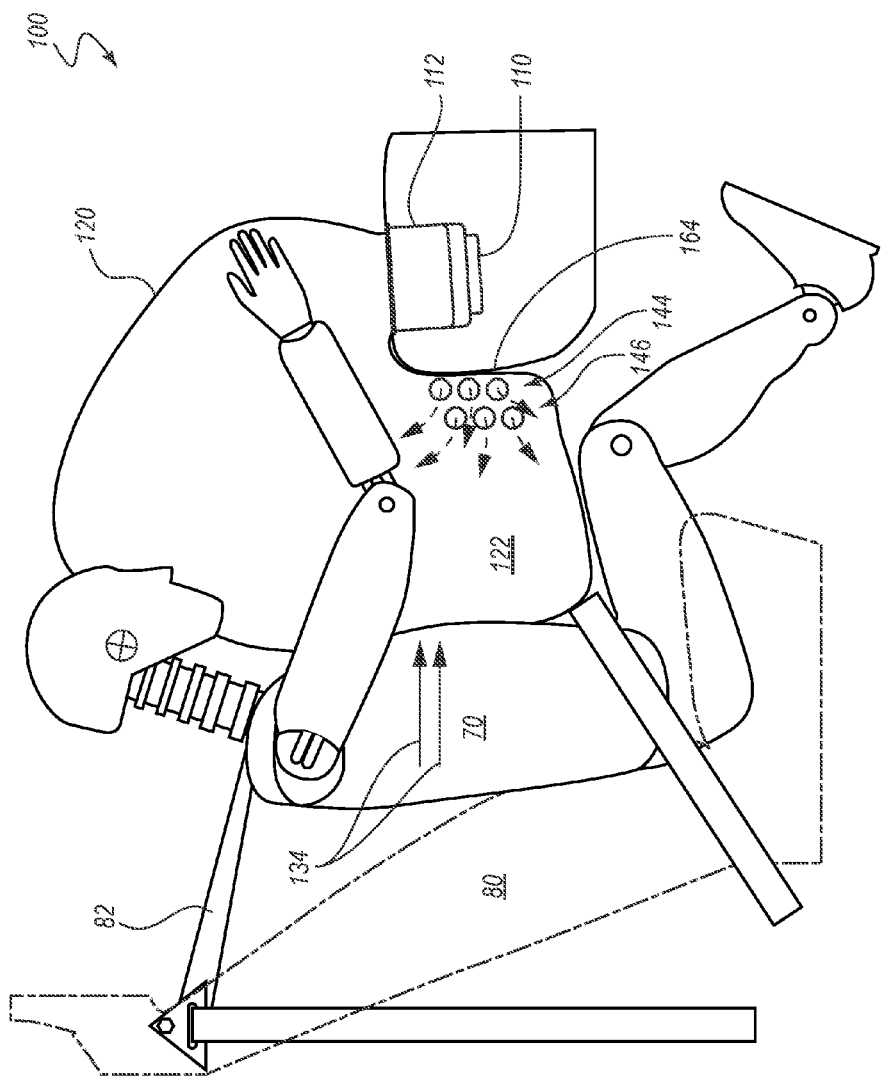
FIG. 1C is a side elevation view of the airbag assembly of FIG. 1A depicted during a collision event in which an occupant is applying a second amount of compression force to the airbag cushion and the degree of compression of the airbag cushion is increased.

FIG. 1C is a side elevation view of the instrument panel 168 and airbag assembly 100 of FIG. 1B in the deployed state, with the occupant applying a second amount of compression force 134 to the airbag cushion 120. The second amount of compression force 134 results in a second degree of compression of the airbag cushion 120. The second amount of compression force 134 may be a greater amount of compression force than the first amount of compression force 132 (depicted in FIG. 1A), which may be due to a relatively greater severity or energy of the collision event. For example, the second amount of compression force 134 may be a result of a collision of a greater speed than the collision event related to FIG. 1B. Referring again to FIG. 1C, the second amount of compression force 134 is sufficient to cause the airbag cushion 120 to deform and compress to the second degree of compression, such that the first set, or column, of vents 142 abuts the instrument panel 168 of the vehicle, thereby transitioning to the closed state. More specifically, as the second amount of compression force 134 causes the airbag cushion 120 to deform, a portion of the lateral panel 122 on which the first set of vents 142 is disposed may roll or otherwise deform to be disposed directly adjacent the instrument panel 168. As the first set of vents 142 abuts the instrument panel 168, the egress of inflation gas through the first set of vents 142 is at least partially inhibited, or obstructed. Obstructing the egress of inflation gas through the first set of vents 142 may decrease the venting capacity of the airbag cushion 120. The second degree of compression may exceed the first threshold level of compression and be less than a second threshold level of compression.

When the venting capacity of the airbag cushion 120 is decreased, the airbag cushion 120 may maintain a relatively higher internal gas pressure during deployment, which may increase the rigidity of the airbag cushion 120. Increased rigidity of the airbag cushion 120 may allow for the receipt of an occupant with a relatively higher amount of compression force to be received by the airbag cushion 120 while limits the airbag cushion 120 from collapsing in response to the occupant's contact with the airbag cushion 120. The increased rigidity of the airbag cushion decreases a likelihood that a higher energy occupant 70 (e.g., applying a greater compression force due to size, speed, crash energy) could contact or strike a hard interior surface of the vehicle, such as the instrument panel 168.

Figure 1D:
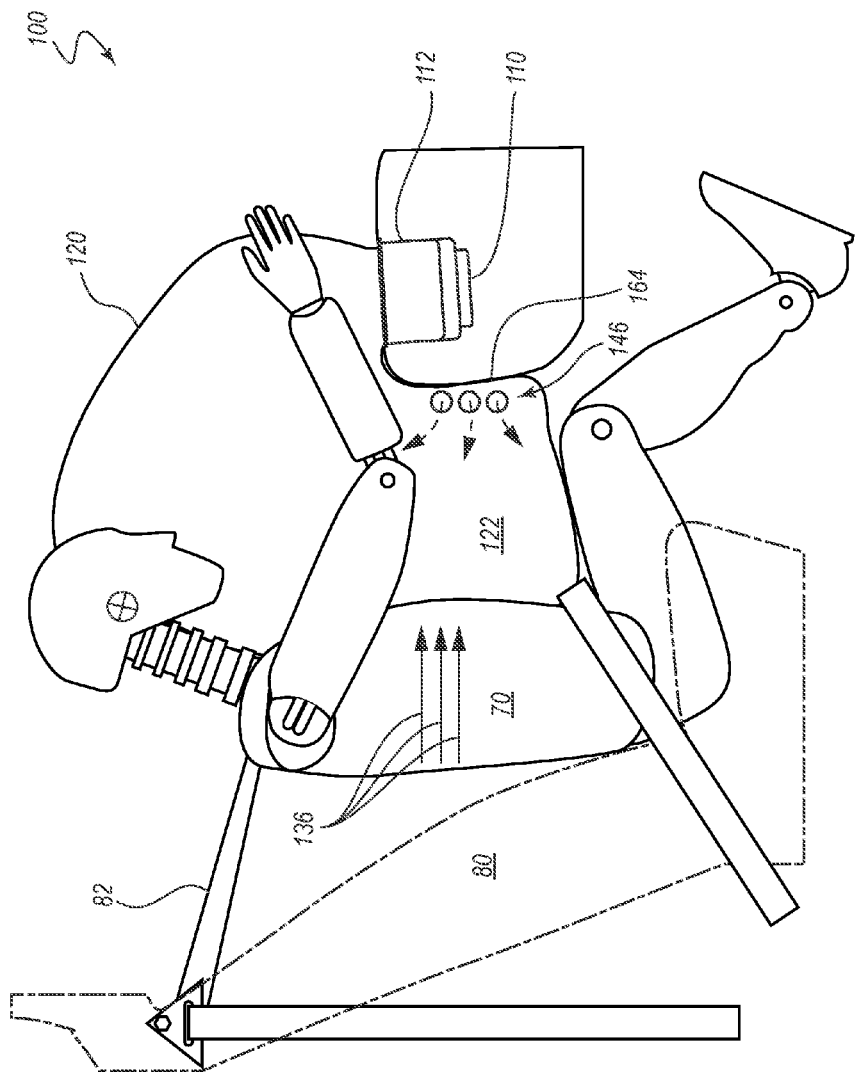
FIG. 1D is a side elevation view of the airbag assembly of FIG. 1A depicted during a collision event in which an occupant is applying a third amount of compression force to the airbag cushion and the degree of compression of the airbag cushion is further increased.

FIG. 1D is a side elevation view of the airbag assembly 100 and instrument panel 168 of FIG. 1B, with the occupant 70 applying a third amount of compression force 136 to the airbag cushion 120. The third amount of compression force 136 may be greater than the first and second amounts of compression force 132, 134. The third amount of compression force 136 may result in a third degree of compression of the airbag cushion 120, which may be greater than the second threshold level of compression and less than a third threshold level of compression. As depicted in FIG. 1D, the third amount of compression force 136 may be sufficient to cause the airbag cushion 120 to deform and compress, such that the first and second sets of vents 142, 144 abut a surface of the vehicle, such as a surface of the instrument panel 168. In other words, the third amount of compression force 136 is sufficient to transition the status of the first and second set of vents 142, 144 to the closed state, which decreases the venting capacity of the airbag cushion 120. In certain embodiments, the second set of vents 144 may abut against a second vehicle surface, which may be different from the surface against which the first set of vents 142 abuts.

Figure 1E:
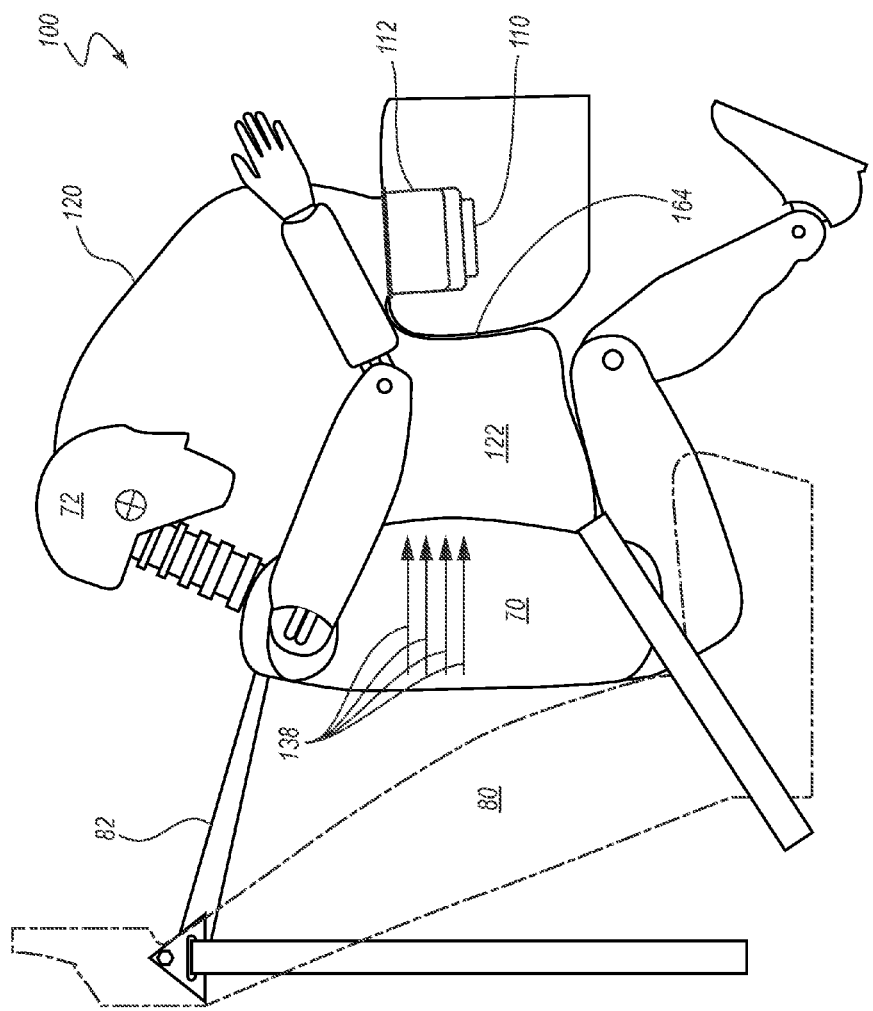
FIG. 1E is a side elevation view of the airbag assembly of FIG. 1A depicted during a collision event in which an occupant is applying a fourth amount of compression force to the airbag cushion and the degree of compression of the airbag cushion is still further increased.

FIG. 1E is a side elevation view of the airbag assembly 100 and instrument panel 168 of FIG. 1B, with the occupant 70 applying a fourth amount of compression force 138 to the airbag cushion 120. The fourth amount of compression force 138 may be sufficient to result in a fourth degree of compression of the airbag cushion, which may exceed the third threshold level of compression and transition all three sets of vents 142, 144, 146 to the closed state. With all three sets of vents 142, 144, 146 in the closed state, the airbag cushion 120 of FIG. 1E may have a minimum venting capacity for its configuration. However, there may be additional vents not depicted in FIG. 1E that continue to allow egress of inflation gas while the three sets of vents 142, 144, 146 are in the closed configuration.

Figure 2:
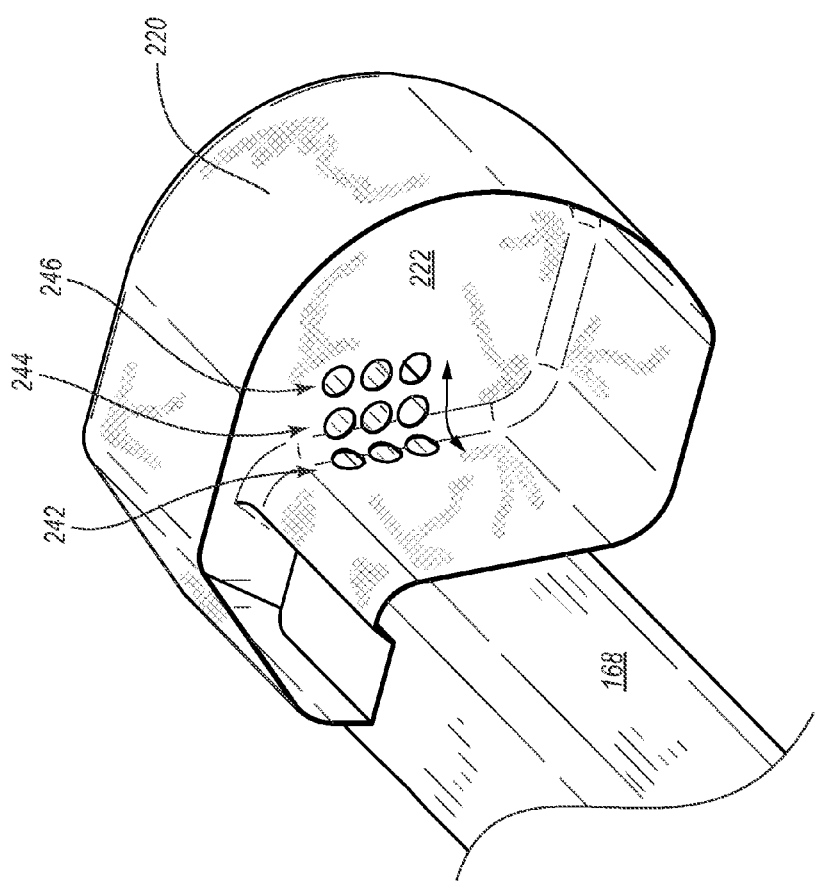
FIG. 2 is a perspective sectional view of a deployed airbag cushion comprising three sets of vents.

As will be understood by someone of skill in the art, an airbag cushion within the scope of this disclosure may include different configurations, shapes, patterns, and/or amounts of vents than those depicted in FIGS. 1B-1E. In some embodiments, an airbag assembly may comprise an airbag cushion having more or less than three sets of vents. In other embodiments, each set of vent may comprise more or less than three vents. In still other embodiments, the number of vents in each set may vary FIG. 2 is a perspective sectional view of an inflatable airbag cushion 220 and a vehicle instrument panel 168. The airbag cushion 220 may be configured to inflate to abut and conform to at least one surface of the instrument panel 168. The airbag cushion 220 may comprise three sets, or columns, of vents 242, 244, 246 along a lateral panel 222 of the airbag cushion 220. The configuration of the sets of vents 242, 244, 246 may be similar to that of the embodiments shown in FIGS. 1B-1E. In FIG. 2, a first set of vents 242 is shown abutting a rearward surface of the instrument panel 168. The airbag cushion 220 may be compressed or deformed such that the first set of vents 242 abuts the rearward surface of the instrument panel 168. The airbag cushion 220 may be compressed or deformed in response to a compression force applied by an occupant. The compression force is sufficient to cause the airbag cushion 220 to be compressed to a degree of compression that exceeds a first threshold level of compression and thereby transition the first set of vents 242 to the closed state. In other words, the airbag cushion 220 of FIG. 2 may be shown in a similar state or configuration as the airbag cushion 220 of FIG. 1C. The degree of compression of the airbag cushion 220 is less than a second threshold level of compression, such that the second set of vents 244 and third set of vents 246 remain unobstructed and in an open state.

Figure 3:
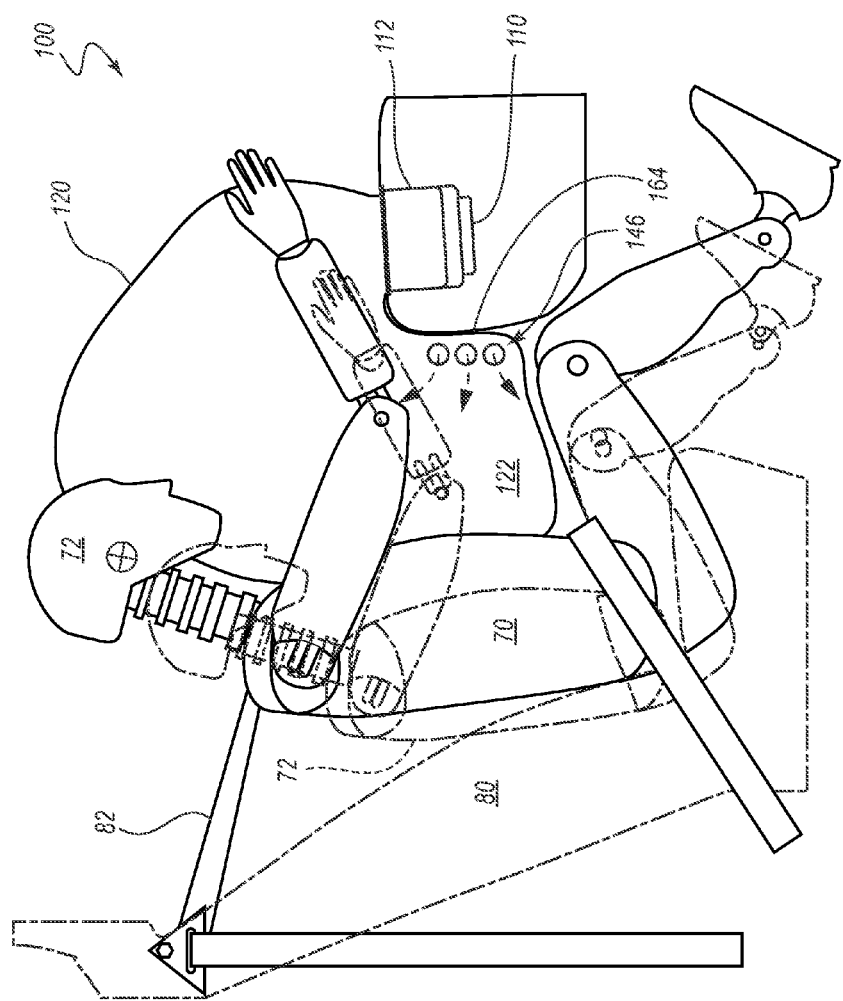
FIG. 3 is a side elevation view of an airbag assembly mounted in an instrument panel of a vehicle depicted during a collision event, and a first occupant is shown superimposed on a second occupant. The first occupant represents an occupant of relatively greater size than the second occupant.

FIG. 3 is a side elevation view of an airbag assembly 100 and an instrument panel 168 during a collision event. The airbag assembly 100 is in a deployed state. A first occupant 70 is shown superimposed on a second occupant 72. The first occupant 70 may represent a larger individual, while the second occupant 72 may represent a smaller individual. For example, the first occupant 70 may represent a male in the 95th percentile for weight, and the second occupant 72 may represent a female in the 5th percentile for weight. Both the first and second occupants 70, 72 are shown secured and restrained by a seatbelt 82. The seatbelt 82 operates on the first and second occupants 70, 72 to restrict their motion in the car-forward direction during a collision. As shown in FIG. 3, the first occupant 70 is slightly more advanced in the car-forward direction than the second occupant 72, which represents a relatively greater amount of compression force that the first occupant 70 applies to the airbag cushion 120 during the collision event, due to the larger size (or mass) of the first occupant 70 as compared to that of the second occupant 72.

Figure 4:
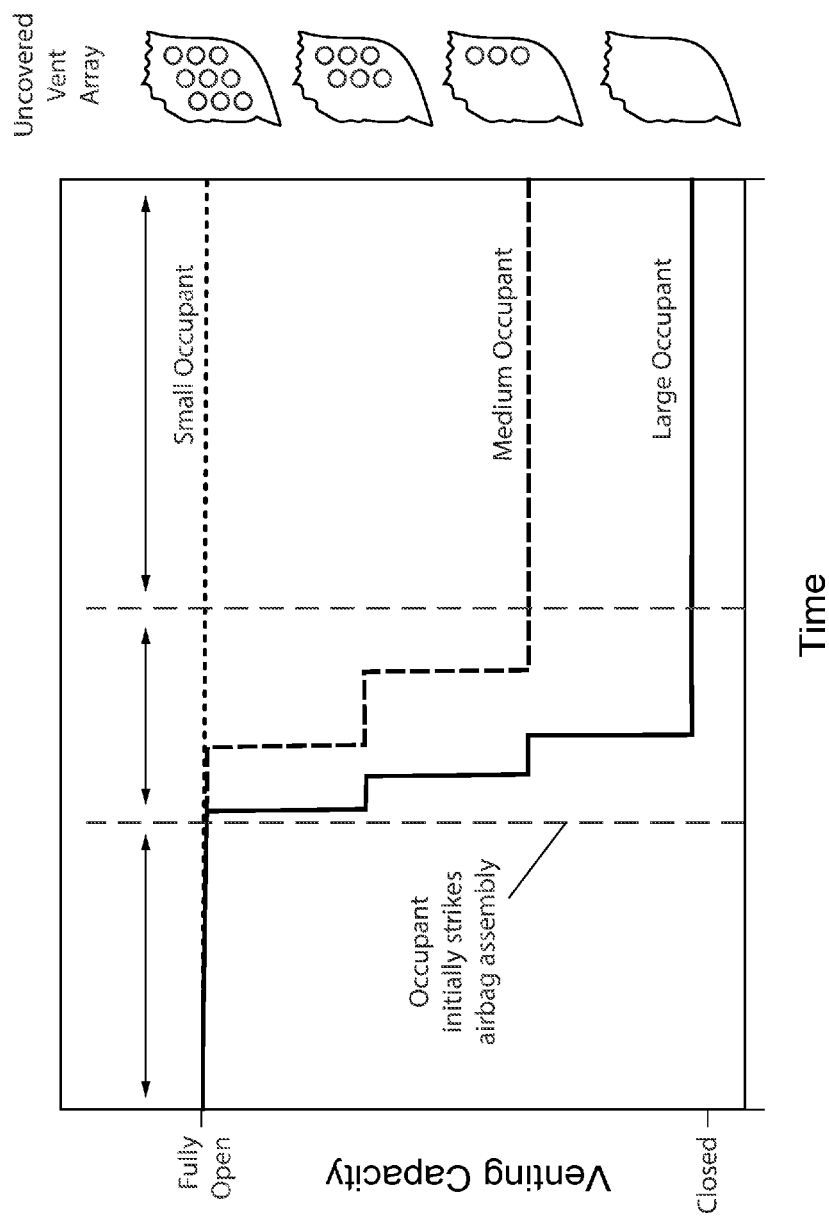
FIG. 4 is a graph illustrating the effect that occupant size can have on the venting capacity of an airbag cushion during a collision event.

FIG. 4 is a graph showing the effect of occupant size on the venting capacity of an airbag cushion, according to one embodiment, during a collision event. The airbag cushion that is the subject of FIG. 4 may be similar to the airbag cushion 120 shown in FIGS. 1A-1E, and 3, or the airbag cushion 220 of FIG. 2. The venting capacity is illustrated by the "Uncovered Vent Array" diagrams to the right of the graph of FIG. 4. The Uncovered Vent Array diagrams also illustrate the state (i.e., open or closed) of three sets of vents as the airbag cushion responds to varying amounts of compression force by a plurality of occupants. A small occupant in the collision event applies a compression force to the airbag cushion that is insufficient to cause any of the sets of vents to change to the closed state. The venting capacity of the airbag cushion being compressed by the small occupant during the collision event is represented by a bold dotted line. A medium occupant in the collision event may apply a compression force to the airbag cushion sufficient to change the first and second sets of vents to the closed state. The venting capacity of the airbag cushion being compressed by the medium occupant is represented by a bold dashed line. As the first and second sets of vents change to the closed state, the venting capacity of the airbag cushion decreases. Finally, a large occupant in the collision event may apply a compression force to the airbag cushion sufficient to change all of the sets of vents of the vent array to the closed state. The venting capacity of the airbag cushion being compressed by the large occupant is represented by the bold solid line.

Near the center of the graph, two vertical dashed lines mark certain points in time during the collision event. The vertical dashed line on the left may signify the point in time when the occupant initially strikes the airbag cushion during a collision event. The vertical dashed line on the right may signify the point in time in which the occupant is no longer advancing in the car-forward direction during or after a collision event. In other words, the vertical dashed line on the right may represent a point in time at which the compression force applied to the airbag cushion by the occupant, and an opposing force (e.g. normal force) applied by the airbag cushion on the occupant are at an equilibrium. In between the two vertical dashed lines near the center of the diagram, the bold dashed and bold solid lines comprise a plurality of steps. The steps may illustrate the effect of the successive closing of sets, or columns, of vents as the airbag cushion compresses and deforms to change one or more sets of vents to the closed state.

As can be appreciated, other embodiments may comprise more or fewer than three sets of vents. Furthermore, additional collision factors, such as use of an occupant restraint device and speed of the vehicle and/or collision, can produce variations of the lines of the graph depicted in FIG. 4.

Figure 5:
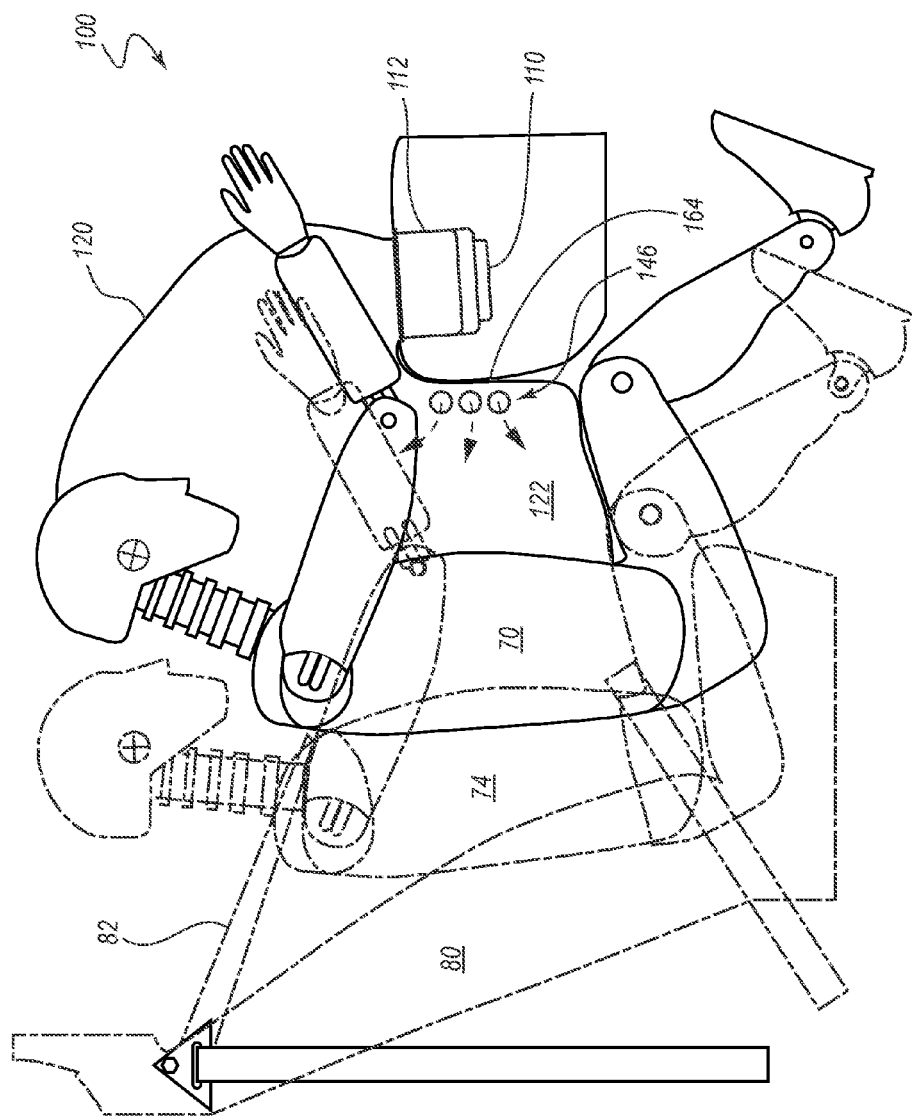
FIG. 5 is a side elevation view of an airbag assembly mounted in an instrument panel of a vehicle depicted during a collision event, and a first occupant is shown superimposed on a second occupant. The first occupant represents an occupant who is not restrained by a seatbelt, and the second occupant represents an occupant that is at least partially restrained by a seatbelt.

FIG. 5 is a side elevation view of an airbag assembly 100 and an instrument panel 168 during a collision event. The airbag assembly 100 comprises an airbag cushion 120. The airbag cushion 120 may have a venting configuration similar to that of the airbag cushion depicted in FIGS. 1B-1E. A first occupant 70 is shown superimposed over a second occupant 74. The first occupant 70 may represent an adult occupant that is not secured by a seatbelt 82, and the second occupant 74 may represent the same or a substantially similar adult occupant that is restrained by the seatbelt 82. FIG. 5 may illustrate the effect that restraint by the seatbelt 82 can have on a compression force generated by an occupant and resulting compression of the airbag cushion 120. The first occupant 70 is shown relatively more advanced in the car forward direction when compared with the second occupant 74. The first occupant's more advanced position relative to the second occupant 74 may be a result of the lack of restraint by the seatbelt 82 when compared with the second occupant 74. With no restraining force in the car-rearward direction, the first occupant 70 may apply a greater amount of compression force to the airbag cushion 120 than the second occupant 74, which may cause the airbag cushion 120 to compress and deform. As depicted, the amount of compression force applied to the airbag cushion 120 by the first occupant 70 may be sufficient to change a first and second set (not pictured) of vents to a closed state, while a third set of vents 146 remains in the open state. In other words, the degree of compression of the airbag achieved in response to the compression force may exceed a first threshold level of compression and a second threshold level of compression, thereby closing the first and second sets of vents. Although not necessarily depicted in FIG. 5, the relatively lower amount of compression force applied by the second occupant 74 may not be sufficient to change the first and second set of vents to the closed state.

Figure 6:
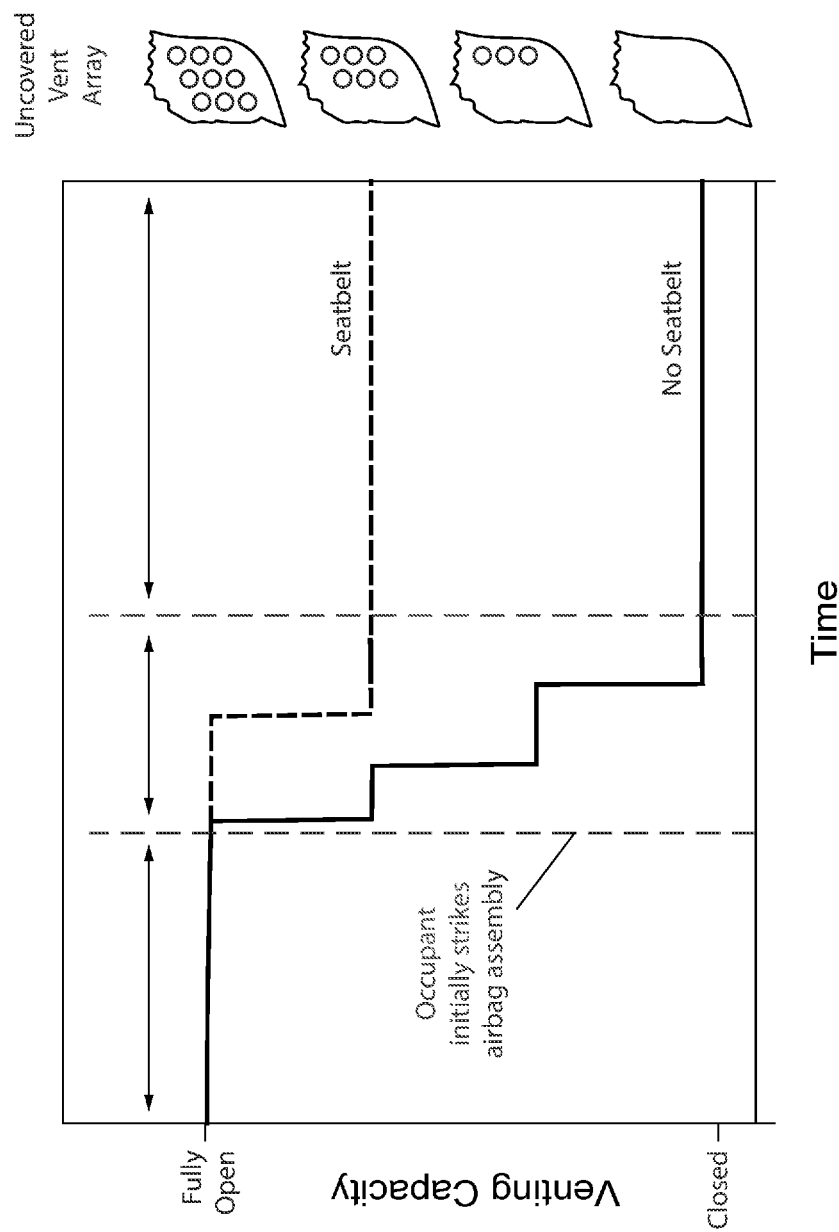
FIG. 6 is a graph illustrating the effect that restraint by a seatbelt or other occupant restraint device can have on the venting capacity of an airbag cushion during a collision event.

FIG. 6 is a graph illustrating the effect that a seatbelt, or other restraining device, can have on the venting capacity of an airbag cushion during a collision event. The graph of FIG. 6 may comprise a similar format and similar elements to the graph of FIG. 4. For example, similar to FIG. 4, the "Uncovered Vent Array" diagrams of FIG. 6 illustrate the venting capacity of an airbag cushion with a similar configuration to the airbag cushion of FIG. 5 with reference to the state or configuration of a plurality of sets, or columns, of vents. The venting capacity of the airbag cushion of FIG. 6 when compressed by an occupant 70 wearing a seatbelt is represented by a bold dashed line, and the venting capacity of the airbag cushion when compressed by an occupant wearing no seatbelt is represented by a bold solid line. The occupant wearing a seatbelt applies a smaller compression force on the airbag cushion, such that a degree of compression of the airbag exceeds a first threshold level, to transition a first set of vents to a closed state. The smaller compression force results in a smaller degree of compression that does not exceed a second threshold level, such that the second and third sets of vents remain in an open state. The occupant not wearing a seatbelt applies a greater compression force on the airbag cushion, such that the degree if compression of the airbag exceeds a third threshold level, which transitions the first, second, and third sets of vents to the closed state.

Although FIG. 6 illustrates a similar scenario as depicted in FIG. 5, it does not necessarily illustrate the same scenario. For example, FIG. 6 may illustrate the effect of restraint of a seatbelt on a larger occupant than the occupant illustrated in FIG. 5, or may illustrate the effect of a seatbelt on an occupant during a collision of greater or lesser severity than the collision related to FIG. 5. Furthermore, as can be appreciated, other embodiments may comprise more or fewer than three sets of vents.

Figure 7:
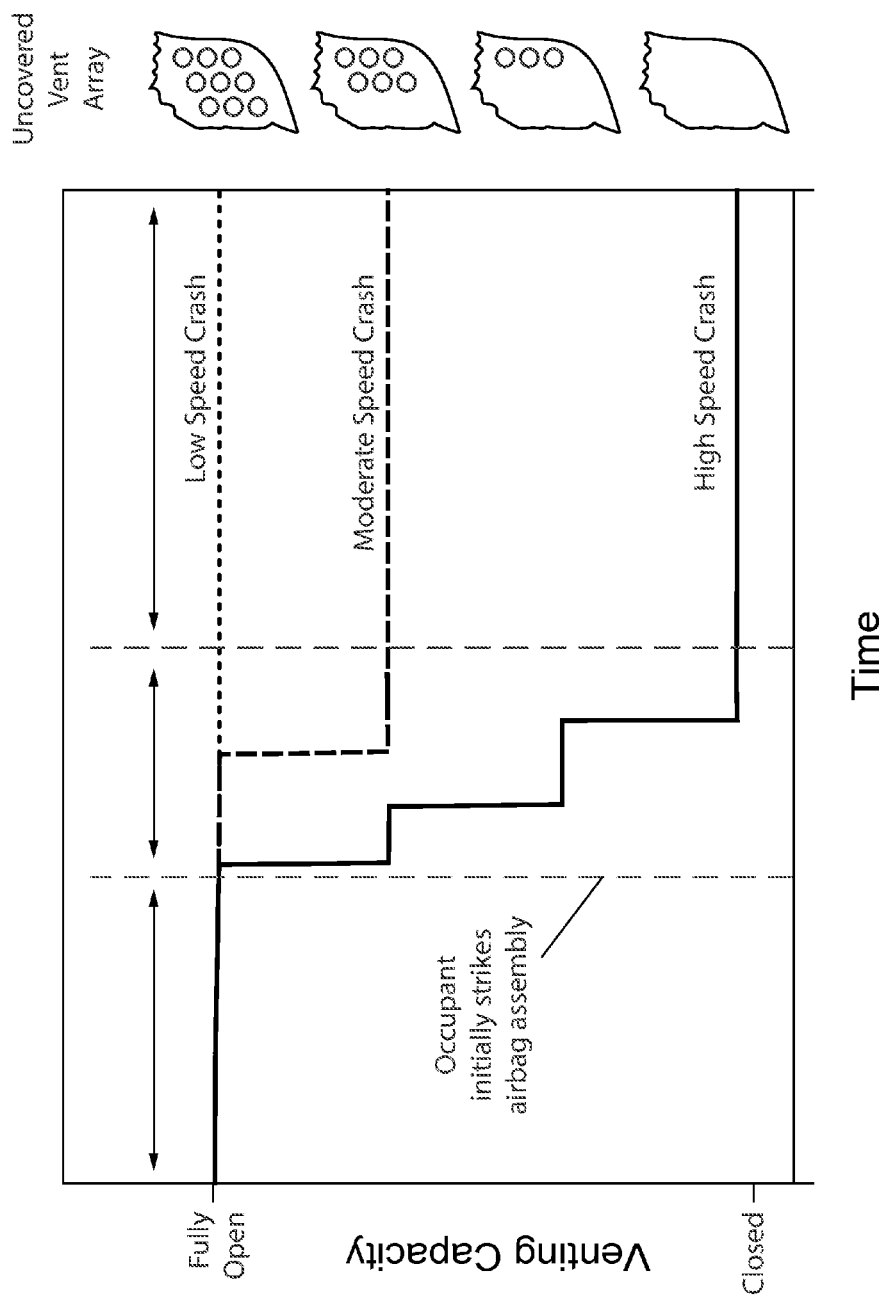
FIG. 7 is a graph illustrating the effect that the speed of a vehicle collision event, or crash, can have on the venting capacity of an airbag cushion during a collision event.

FIG. 7 is a graph illustrating the effect of the degree of speed or force of a collision event on the venting capacity of an airbag cushion comprising a plurality of sets of vents. The graph of FIG. 7 comprises a format and elements similar to the diagrams of FIGS. 4 and 6. As illustrated in FIG. 7, the venting capacity of an airbag cushion, according to one embodiment, decreases as speed or force of the collision event increases. For example, in a "Low Speed Crash," the amount of compression force applied to the airbag cushion by an occupant may not be sufficient to change any of a plurality of sets of vents to a closed state. When none of the plurality of sets of vents of the airbag cushion of FIG. 7 are in the closed state, the venting capacity of the airbag cushion may be described as "fully open." In a moderate speed crash, the amount of compression force applied to the airbag cushion by the occupant may be sufficient to change a first set of vents to the closed state, but not sufficient to change a second and third set of vents to the closed state. In a high speed crash, the amount of compression force applied to the airbag cushion by the occupant may be sufficient to change the first, second, and third sets of vents to the closed state. When the three sets of vents (all the sets of vents) of the airbag cushion of FIG. 7 are in the closed state, the venting capacity of the airbag cushion may be described as "closed."

Figure 8:
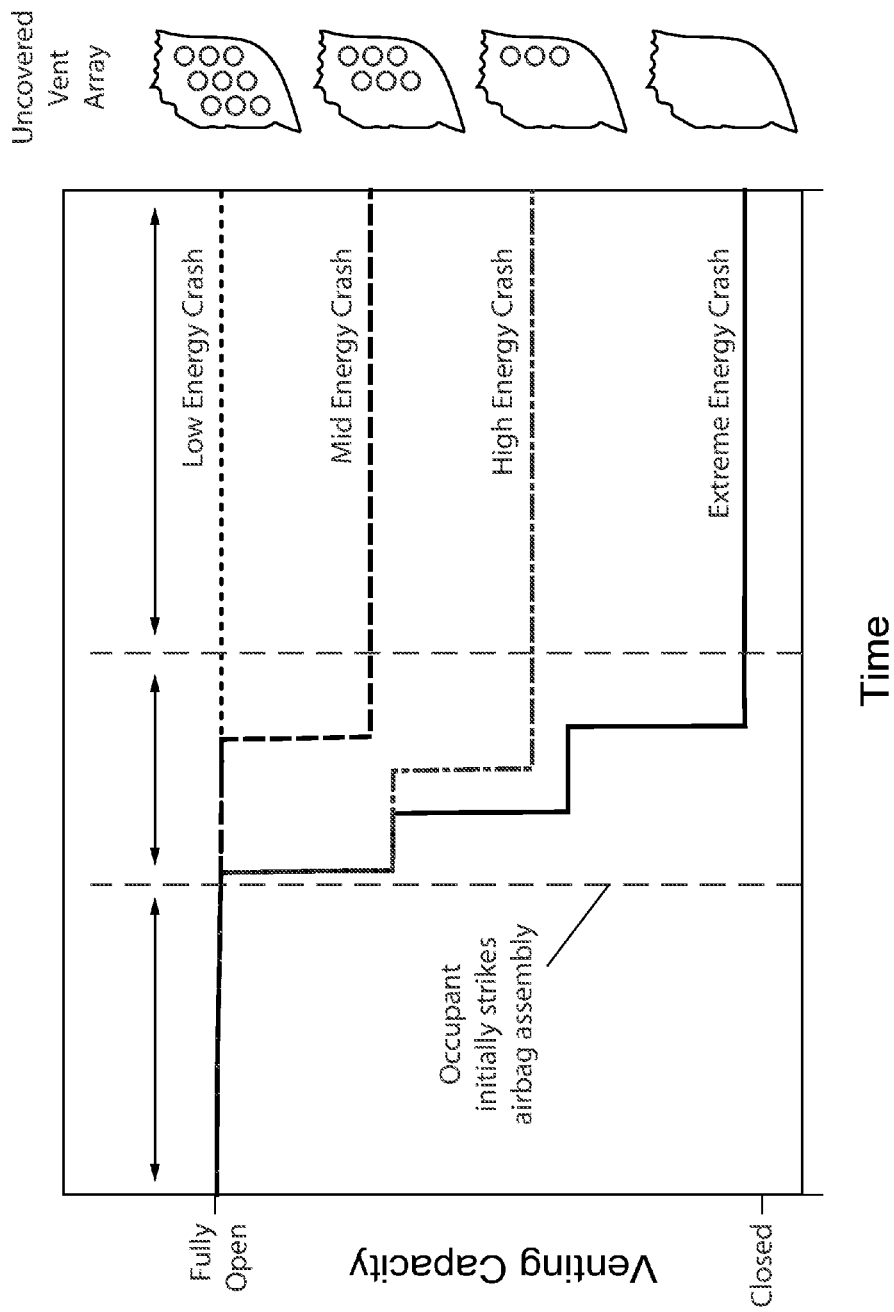
FIG. 8 is a graph illustrating the effect that the degree of energy of a collision event can have on the venting capacity of an airbag cushion during a collision event.

FIG. 8 is a graph illustrating the effect of the degree of energy of a collision event on the venting capacity of an airbag cushion comprising a plurality of sets of vents. The graph of FIG. 8 comprises a format and elements similar to the diagrams of FIGS. 4, 6, and 7. As illustrated in FIG. 8, the venting capacity of an airbag cushion, according to one embodiment, decreases as the degree of energy of the collision event increases. The energy of the collision event, or crash, may refer not only to the speed or energy of the vehicle collision, but may also be based on an aggregate of other factors, including the size of the occupant, and whether or not a seatbelt was used to the secure the occupant. For example, in a low energy crash, the amount of compression force applied to the airbag cushion by an occupant may not be sufficient to change any of a plurality of sets of vents to a closed state. The relatively low degree of energy of the low energy crash may be related to a relatively small occupant, and/or a relatively low speed collision event in which the occupant is wearing a seatbelt. By contrast, the relatively high degree of energy of a high energy crash may be related to a relatively large occupant, and/or a relatively high speed collision in which the occupant is not wearing a seatbelt.

For the purposes of this disclosure, the terms "a" or "an" may refer generally to a single element, but do not exclude the addition of other elements of the same type. For example, although an airbag assembly which comprises "a set of vents" may be provided in this disclosure, the disclosure may contemplate the airbag assembly comprising additional sets of vents. The term "coupled to" may be used to describe a physical interaction of one element with another element without limiting the interaction to a direct physical connection or contact. For example, two elements may be coupled to one another although there are intermediate elements separating the two elements.

It will be obvious to those having skill in the art that many changes may be made to the details of the above-described embodiments without departing from the underlying principles of the invention. For example, (more or less vents, sets of vents, different shapes of vents, vents on different panels, vents that close using other vehicle surfaces, vents in other patterns or arrays, vents that don't roll to abut, etc.). The scope of the present invention should, therefore, be determined only by the claims that follow.

The invention claimed is:

1. An airbag assembly with passive adaptive venting, comprising:
   an airbag cushion to receive inflation gas from an inflator and thereby expand to deploy from a housing mounted in a vehicle, the airbag cushion, when deployed, to provide a rearward face to receive an occupant of the vehicle, a forward face to contact a solid vehicle surface within a passenger compartment of the vehicle, and a lateral face extending between the rearward face and the forward face; and
   a set of vents disposed through a panel of the airbag cushion, wherein the set of vents, in a first deployed state of the airbag cushion, is to be positioned on the lateral face of the airbag cushion adjacent the solid vehicle surface and, in a second deployed state of the airbag cushion, to be positioned on the forward face of the airbag cushion to be obstructed by the solid vehicle surface in a second state of the airbag cushion, wherein the airbag cushion is more compressed in the second deployed state than in the first deployed state.

2. The airbag assembly of claim 1, further comprising a second set of vents disposed through the panel and adjacent the set of vents, wherein the second set of vents, in the first deployed state and the second deployed state, is to be positioned on the lateral surface of the of the airbag cushion and, in a third deployed state, is to be positioned on the forward face of the airbag cushion to be obstructed by the solid vehicle surface, wherein the airbag cushion is more compressed in the third deployed state than in the second deployed state.

3. The airbag assembly of claim 2, further comprising a third set of vents disposed through the panel and adjacent the second set of vents, wherein the third set of vents, in the first deployed state, the second deployed state, and the third deployed state of the airbag cushion, is configured to be positioned on the lateral surface of the of the airbag cushion and, in a fourth deployed state of the airbag cushion, is configured to be positioned on the forward surface of the airbag cushion to be obstructed by the solid vehicle surface, wherein the airbag cushion is more compressed in the fourth deployed state than in the third deployed state.

4. The airbag assembly of claim 1, wherein the set of vents comprises a plurality of apertures.

5. The airbag assembly of claim 4, wherein the plurality of apertures is arranged in an array oriented vertical relative to the vehicle.

6. The airbag assembly of claim 1, wherein the solid vehicle surface is an instrument panel in a passenger compartment of the vehicle.

7. An airbag assembly with passive adaptive venting, comprising:
   an airbag cushion formed of one or more panels that define an inflatable chamber to receive inflation gas from an inflator and expand, the airbag cushion to deploy from a housing as the inflatable chamber expands, the airbag cushion to provide an occupant facing surface to receive an occupant in a collision, a forward surface to contact a vehicle structure, and a lateral surface between and adjacent the occupant facing surface and the forward surface; and
   an array of vents disposed through a panel of the one or more panels that define the inflatable chamber, the array of vents configured to be positioned on the lateral surface of the airbag cushion adjacent the vehicle structure that is in contact with the forward surface of the airbag cushion in a first state of the airbag cushion and configured to be obstructed by the vehicle structure in a second state of the airbag cushion, wherein the second state is a more compressed state than the first state.

8. The airbag assembly of claim 7, further comprising a second array of vents disposed through the panel, the second array of vents positioned adjacent the array of vents, the second array of vents configured to be positioned on the lateral surface of the of the airbag cushion in the first state of the airbag cushion, configured to positioned on the lateral surface adjacent the vehicle structure in the second state of the airbag cushion, and configured to be obstructed by the vehicle structure in a third state of the airbag cushion, wherein the third state is a more compressed state than the second state.

9. The airbag assembly of claim 8, wherein the second array of vents is positioned adjacent the array of vents on a horizontal axis of the airbag cushion when in a deployed state.

10. The airbag assembly of claim 7, wherein the first state of the airbag cushion includes a level of compression below a first threshold and the second state of the airbag cushion includes a level of compression above the first threshold.

11. The airbag assembly of claim 7, wherein the array of vents, when unobstructed, is oriented such that an opening of each vent of the array of vents lies in a plane transverse to a surface of the vehicle structure that obstructs the set of vents.

12. The airbag assembly of claim 7, wherein the airbag cushion transitions from the first state to the second state in response to a force on the occupant facing surface causing compression of the airbag cushion.

* * * * *